Dec. 30, 1924.  
N. A. CARTER  
UNLOADING DEVICE  
Filed Aug. 25, 1923    5 Sheets-Sheet 1
1,521,505
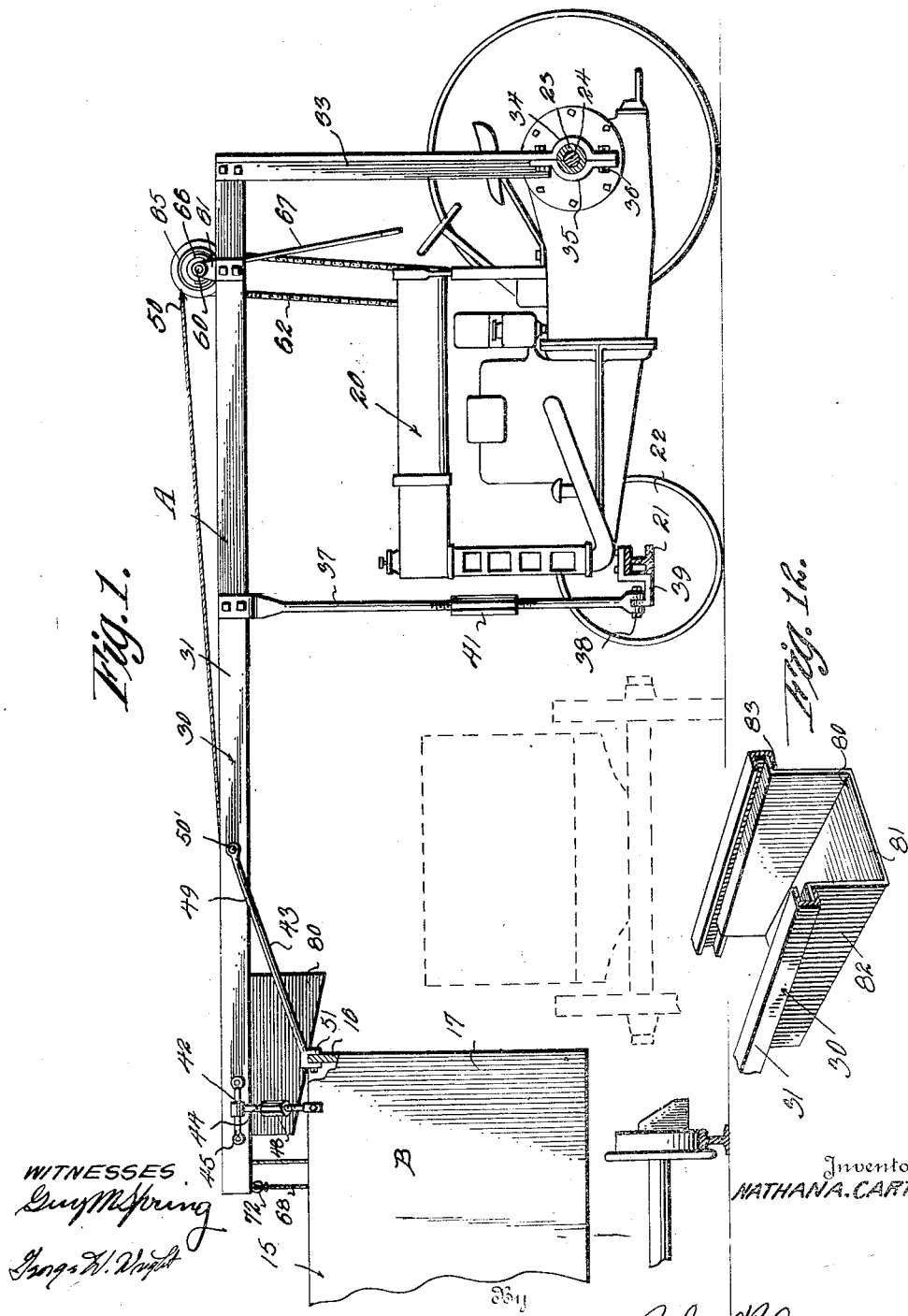

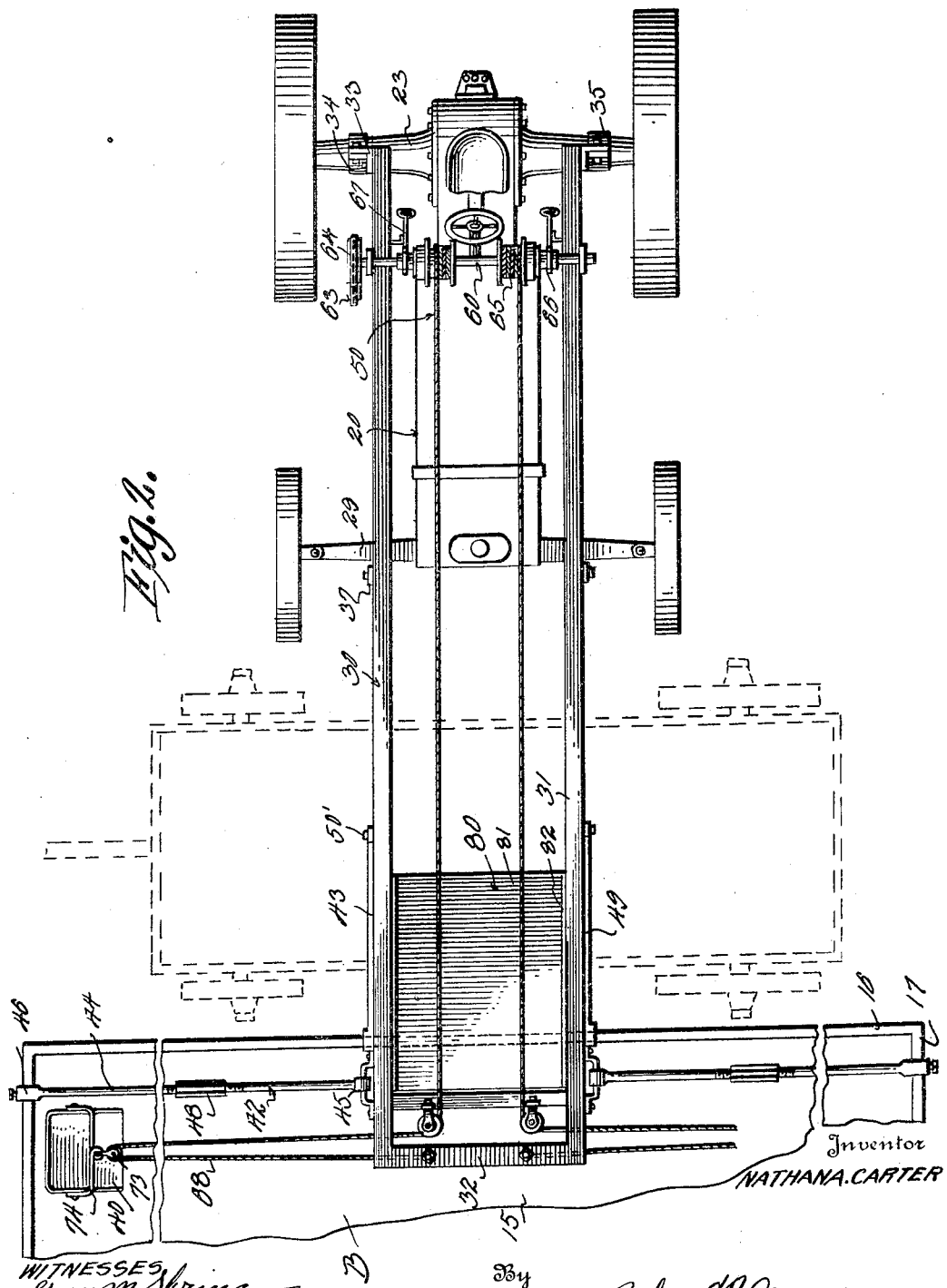

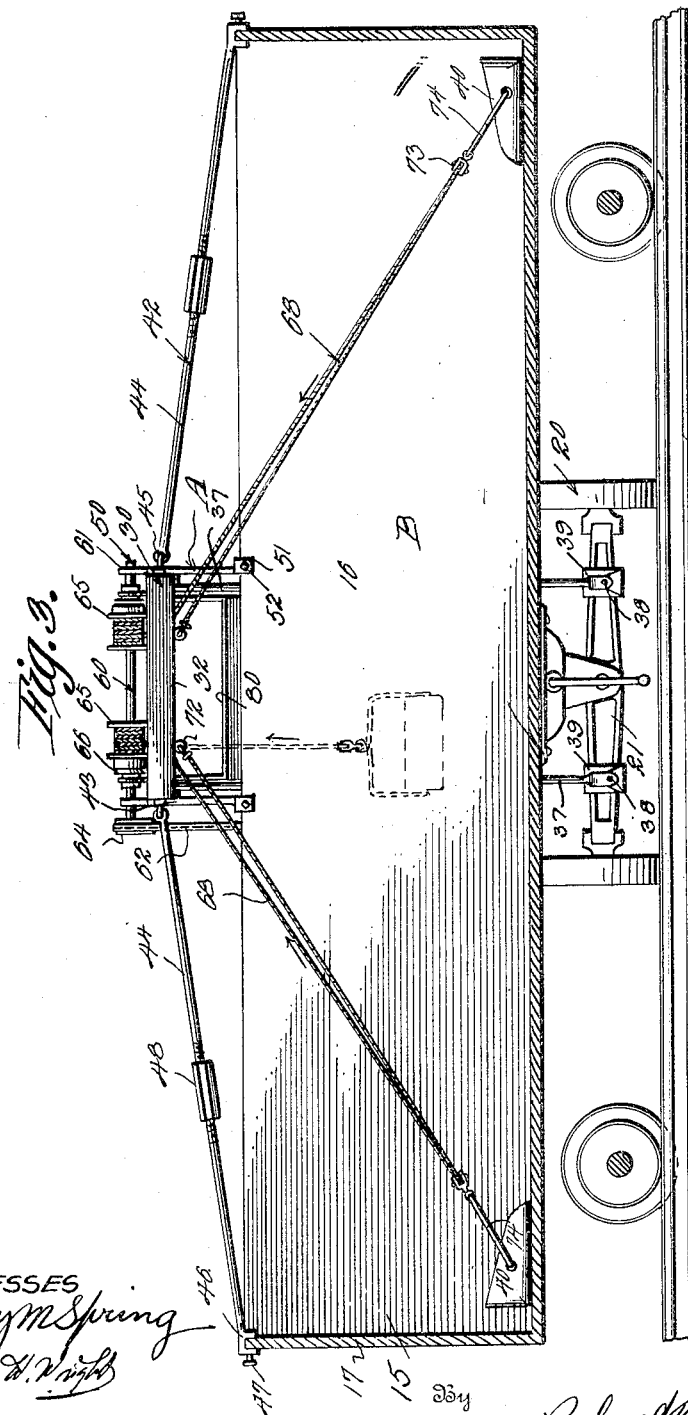

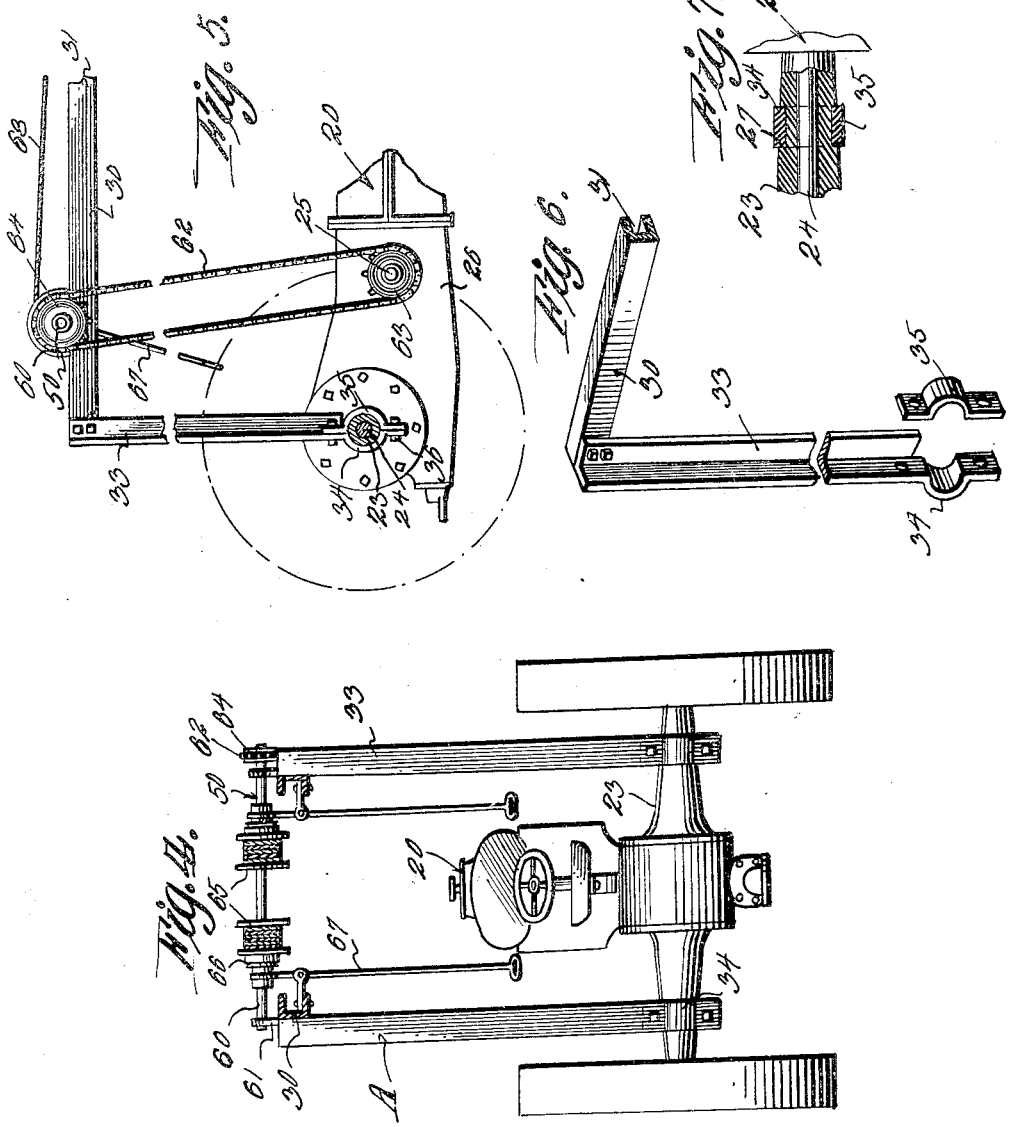

Dec. 30, 1924.
N. A. CARTER
UNLOADING DEVICE
Filed Aug. 25, 1923
1,521,505
5 Sheets-Sheet 5
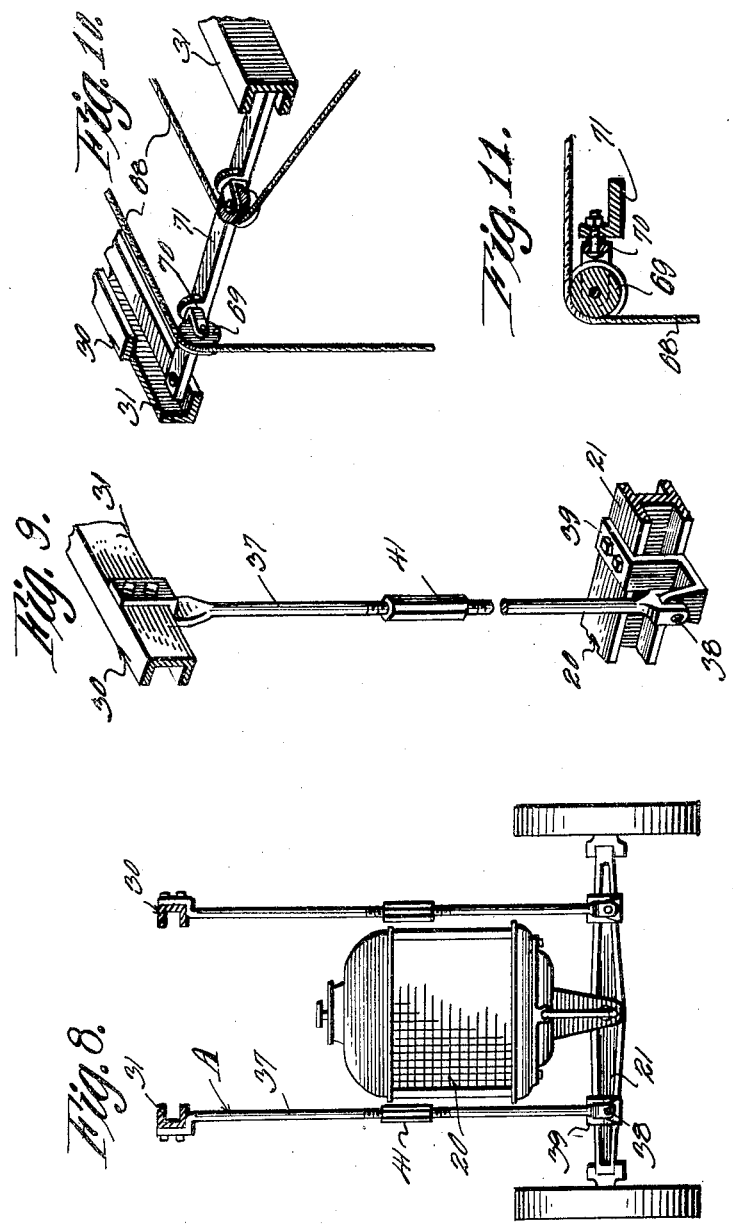
WITNESSES
Inventor
NATHAN A. CARTER
By Richard B. Owen, Attorney

Patented Dec. 30, 1924.

1,521,505

UNITED STATES PATENT OFFICE.

NATHAN A. CARTER, OF EARL, ARKANSAS.

UNLOADING DEVICE.

Application filed August 25, 1923. Serial No. 659,420.

*To all whom it may concern:*

Be it known that I, NATHAN A. CARTER, a citizen of the United States, residing at Earl, in the county of Crittenden and State of Arkansas, have invented certain new and useful Improvements in an Unloading Device, of which the following is a specification.

This invention appertains to novel means for unloading railroad cars and the like and the primary object of the invention is to provide a mobile unloading mechanism adapted to be driven up to a railroad car which is to be unloaded and which is provided with means for engaging and dumping the load carried by the car into wagons and the like.

A further object of the invention is to provide a novel unloading device, which can be built as an attachment for tractors or as integral part thereof.

A further prime object of this invention is to provide a novel unloading device embodying a novel unloading frame connected with a tractor, means carried by the frame for detachably engaging a railroad car to be unloaded for holding the tractor in spaced relation thereto, buckets for engaging the load and novel means operable by the power of the tractor for raising the buckets to facilitate the dumping thereof into wagons and the like, which can be driven under the frame work and between the tractor and the railroad car.

A further prime object of the invention is to provide novel means for connecting the forward end of the frame work to the railroad car in such a manner that the frame work will be braced laterally and vertically, so as to effectively prevent movement of the frame work in relation to the railroad car during the unloading thereof.

A further prime object of the invention is to provide novel means for operating the unloading buckets from the drive pulley shaft of the tractor and novel means for controlling the raising of said buckets.

A still further object of the invention is to provide an improved unloading device of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1 is a side elevation of the improved unloading device showing the same in operative position to a railroad car to be unloaded, a portion of the tractor of the improved device being shown in section.

Figure 2 is a top plan view of the improved unloading device showing the same in operative position for unloading a railroad car.

Figure 3 is a front elevation of the improved device showing the same in operative position for unloading a car, the car being shown in longitudinal vertical section.

Figure 4 is a rear elevation of the improved unloading device showing parts thereof in section and illustrating the means for controlling the operation of the winding drums.

Figure 5 is a fragmentary side elevation of the improved device illustrating the means for operating the winding drum from the pulley drive shaft of the tractor, parts of the tractor being broken away and in section.

Figure 6 is a fragmentary detail perspective view illustrating the means employed for connecting the rear end of the supporting frame with the tractor.

Figure 7 is a detail enlarged sectional view illustrating the means for connecting the frame with the rear axle housing of the tractor.

Figure 8 is a vertical transverse section through the improved unloading device illustrating the means of connecting the supporting frame with the front dead axle of the tractor.

Figure 9 is a fragmentary detail perspective view illustrating the means of connecting the supporting frame with the front dead axle of the vehicle.

Figure 10 is a detail fragmentary perspective view illustrating the means of supporting the hoisting cables from the forward end of the supporting frame.

Figure 11 is a detail sectional view through the improved device illustrating the means of supporting one of the hoisting cables, and Figure 12 is a fragmentary detail perspective view of a portion of the frame illustrating the means of associating the dumping chute with the frame.

Referring to the drawings in detail, wherein similar reference characters designate corresponding parts throughout the several views, the letter A generally indicates the improved unloading device and B a railroad car which is to be unloaded. The railroad car B can be of any preferred character, and as shown the same is of a gondola type including the open body 15 having the longitudinal side walls 16 and the ends walls 17.

The improved unloading device A includes a tractor 20 of a well known type, a supporting frame 30, hoisting buckets 40, and means for hoisting the buckets from the tractor 50.

As stated the tractor 20 is of a well known make and includes the front dead axle 21 with which the steering wheels 22 are connected in the ordinary manner, the rear drive axle housing 23 for the rear drive axle 24 and the pulley drive shaft 25 disposed at one side of the transmission housing 26. The front dead axle 21 is of the usual I-beam construction, as can be readily seen by referring to Figure 1 of the drawings. As shown the rear axle housing 23 is provided with annular grooves 27 adjacent to its terminals for a purpose, which will be hereinafter more fully described.

The frame 30 is arranged above the tractor 20 and is so constructed as to protrude forwardly therefrom an appreciable distance, for a purpose, which will be hereinafter more fully described. This frame 30 includes longitudinally extending horizontally disposed beams 31 which are preferably of a channel beam construction. These beams 31 can be connected together at their forward ends by a transverse beam 32, and the frame can be braced in any other desired way.

A pair of supporting standards 33 are bolted or otherwise secured to the rear ends of the longitudinal beams 31 and these standards are preferably formed from angle iron. As shown, the lower ends of the standards 33 are cut and bent to form semi-circular clamping members 34, which are fitted within the grooves 27. A companion semi-circular clamping member 35 is provided for each clamping member 34 and this member is secured to the clamping member 34 by suitable bolts or the like 35. By this construction, it is obvious that the standards 33 can be firmly connected to the rear axle housing 23 against lateral movement. This connection will also permit a swinging movement of the standards on the rear axle housing if so desired, or necessary. The frame 30 is connected to the front dead axle 21 of the tractor 20 by means of depending standards 37, which are connected by means of bolts 38 with L-shaped brackets 39, which are bolted or otherwise secured directly to the dead axle 21. It is preferred to incorporate a take-up device 41 in the standards 37, such as a turn buckle device in order to adjust the axle of the frame. Due to the connection of the standard 33 with the rear axle housing 23, this angular adjustment is permitted.

In actual use, the frame 30 is adapted to protrude directly over a railroad car B and the frame is of such a length as to permit a wagon or an automobile motor truck to be driven under the frame between the railroad car B and the tractor 20, as clearly shown in Figure 1 of the drawings.

In order to permit the firm connection of the frame with a railroad car so as to prevent lateral movement thereof, I have provided novel connecting means 42 and 43.

The means 42 comprises a pair of laterally extending arms 44 which are pivotally connected as at 45 to the longitudinally extending side beams 31. The terminals of the arms 44 are provided with U-shaped clamps 46 for engaging the side walls 17 of the railroad car B and these U-shaped clamping members can carry suitable set screws or the like 47 for impinging against the side walls of the car. Suitable takeups such as turn buckles 48 are incorporated in the lengths of the arms 44, so that the device can be connected to different lengths of cars.

The means 43 comprises a pair of forwardly extending arms 49, which are pivoted as at 50 to the side longitudinal beams 31 and the forward ends of these rods terminate in rigid U-shaped clamping heads 51 for engaging the side walls 15 of the railroad car and these U-shaped clamping heads 51 are held in place by suitable set screws 52, which are adapted to impinge against the side walls of the car. It is obvious that the arms 49 will hold the frame 30 in correct position in relation to the car B.

The means 50 utilized for raising the buckets 40 comprises a transversely extending driven shaft 60 rotatably mounted in suitable bearings 61 carried by the side beams 31. This driven shaft is preferably arranged directly above the pulley drive shaft 25 of the tractor 20 and is operatively connected to the said pulley drive shaft through the medium of a sprocket chain 62, which is trained about sprocket wheels 63 and 64 keyed or otherwise secured respectively to the shaft 25 and the driven shaft 60. The shaft 60 has rotatably mounted upon the same suitable drums 65, which can be operatively connected to the shaft 60 through the medium of manually operated clutches or the like 66. These clutches 66 are operated by control rods 67, which extend down from the frame 40 toward the operator's seat on the tractor 20. By throwing in the clutches the drums 65 can be rotated with the shaft 60. These drums 65 have wound about the same hoisting cables 68, which are trained over guide pulleys 69, swivelly connected as at 70 to a supporting bar 71 secured to the frame 30 adjacent to the forward end thereof. The outer terminals of the cables 68 are secured to suitable eyes or the like 72 to the forward transverse beam 32 of the frame. The intermediate portions of the hoisting cables 68 between the guide pulleys 69 and the eyes 72 are trained over pulleys 73 carried by the hoisting bails 74 of the buckets 40.

In operation of the improved unloading device the frame 30 is connected to the tractor 20 as heretofore described, and the tractor is driven up to a car B, which is to be unloaded. Means 42 and 43 are connected to the car B, in the manner heretofore described for effectively connecting the frame to the car and the buckets 40 are placed within the car. The men, which are employed for operating the buckets 40 guide the buckets 40 along the bottom of the car so as to scoop up the material contained therein during which time the winding drum 65 is set in operation by the shaft 60 which will raise the buckets to the level of the unloading chute 80 after which the buckets are dumped manually into the same. After the buckets have been dumped into the chute 80 the clutches 66 are operated so as to disconnect the winding drums from the driver shaft and the buckets are drawn back into the car body manually and the operation is repeated.

Any preferred type of dumping chute 80 can be employed, but I prefer to use the type of chute shown in Figure 12, which embodies an inclined bottom 81 and supporting side walls 82. The upper ends of the side walls 82 can be provided with laterally extending right angular disposed supporting flanges 83, which can fit within channels of the channel beams 31. This of course also permits the adjustment of the chute. It is of course to be understood that a wagon or motor truck is to be driven directly below the unloading chute, so as to receive the material therefrom, when the buckets are dumped into the same.

From the foregoing description, it can be seen that I have provided an exceptionally simple and durable device for quickly unloading a railroad car or the like.

Changes in details may be made without departing from the spirit or the scope of this invention.

What I claim as new is:

1. In combination with a railroad car including longitudinal side walls and end walls, of a device for facilitating the unloading of the car including a mobile base, an overhead frame carried by the base arranged to project forwardly therefrom, connecting arms pivotally carried by the frame for engaging the side and end walls of the car, a driven shaft, means for operating the driven shaft from the mobile carrier, hoisting buckets, disposed in said car, hoisting cables for the buckets, and means operatively connecting the hoisting cables with the driven shaft for facilitating the raising of said buckets.

2. The combination with a railroad car including side and end walls, of means for facilitating the unloading of the railroad cars including a mobile carrier, an overhead supporting frame connected with the carrier and arranged to project forwardly therefrom and over the side wall of the railroad car, laterally extending connecting arms pivoted to the frame, clamps formed on the forward ends of the arms for engaging the side walls of the car, forwardly extending connecting arms pivoted to the frame, clamps carried by the forward ends of the arms for engaging one side wall of the railroad car on each side of the frame, an unloading chute carried by the frame and arranged to extend over the side wall of the car, unloading buckets, hoisting cables carried by the frame and connected to said buckets and means for winding up the cables to raise said buckets.

3. In a device for facilitating the unloading of railroad cars and the like comprising a power driven tractor, an overhead frame arranged above the tractor and constructed to project forwardly therefrom, means connecting the frame to the front and rear axles of the tractor, hoisting buckets associated with the forward end of the frame, and means operated by the tractor for raising said buckets.

4. In a device for facilitating the unloading of railroad cars comprising a frame, a tractor for supporting the frame arranged below the frame at the rear end thereof, depending rigid supporting standards secured to the rear end of the frame, clamps for connecting the standards to the rear axle housing of the tractor, depending supporting arms carried by the frame at a point intermediate its ends, means connecting the supporting arms to the dead axle of the tractor, clamping members carried by the frame for engaging a railroad car to be unloaded, unloading buckets carried by the forward end of the frame, hoisting cables for the buckets, a driven shaft carried by the frame, means for operating the driven shaft from the tractor, winding drums rotatably mounted upon the driven shaft, manually operated clutches for connecting the drums with the driven shaft for rotation therewith, and hoisting cables wound about the drums and connected with said buckets.

5. In a device for facilitating the unloading of railroad cars and the like, the combination with a tractor embodying a rear axle housing, a front dead axle, and a pulley drive shaft, of an overhead frame arranged to project forwardly from the tractor, means for connecting the frame to the rear drive axle housing and to the front dead axle, a driven shaft rotatably carried by the frame, sprocket wheels secured respectively to the driven shaft and to the pulley drive shaft, a sprocket chain trained about said sprocket wheels, winding drums rotatably mounted upon the driven shaft, manually operated clutches for connecting the drums with the driven shaft, laterally projecting arms carried by the sides of the frame for engaging the end walls of the car to be unloaded, forwardly projecting connecting arms pivotally connected to the frame for engaging one side wall of the car to be unloaded, side pulley wheels swivelly connected to the forward end of the frame, cables trained over said pulleys, and wound about said drums, means connecting the forward ends of the cables to the frame, unloading buckets, pulleys carried by the unloading buckets receiving the cables for permitting the raising of the buckets, and an unloading chute carried by said frame.

6. In a device for facilitating the unloading of a railroad car, the combination with a tractor, of an overhead frame, means connecting the frame with the tractor, the frame being arranged to project forwardly from the tractor, means carried by the frame for engaging a railroad car to be unloaded, hoisting buckets arranged to fit within the car, means operated by the tractor for raising the hoisting buckets, and an inclined unloading chute slidably carried by the frame arranged between the forward end of the frame and the tractor.

In testimony whereof I affix my signature in presence of two witnesses.

NATHAN A. CARTER.

Witnesses:
J. C. JOHNSON,
H. W. MOXEY.